(12) United States Patent
Horibe

(10) Patent No.: US 6,831,591 B2
(45) Date of Patent: Dec. 14, 2004

(54) RADAR DEVICE FOR A VEHICLE

(75) Inventor: Koji Horibe, Kasugai (JP)

(73) Assignee: OMRON Corporation, Kyoto (JP)

(*) Notice: Subject to any disclaimer, the term of this patent is extended or adjusted under 35 U.S.C. 154(b) by 0 days.

(21) Appl. No.: 10/681,840

(22) Filed: Oct. 8, 2003

(65) Prior Publication Data

US 2004/0080449 A1 Apr. 29, 2004

(30) Foreign Application Priority Data

Oct. 25, 2002 (JP) ......................... 2002-311680

(51) Int. Cl.[7] .................. G01S 13/93; G01S 13/86
(52) U.S. Cl. ..................... 342/52; 342/54; 342/55; 342/70; 342/74; 342/174; 342/179
(58) Field of Search ..................... 342/52, 54, 55, 342/70, 71, 72, 74, 75, 174, 179; 340/435, 436, 903, 935, 937; 356/4.01, 141.1, 5.01, 5.1; 701/301

(56) References Cited

U.S. PATENT DOCUMENTS

| | | | | |
|---|---|---|---|---|
| 6,122,040 A | * | 9/2000 | Arita et al. | 356/4.01 |
| 2003/0078730 A1 | * | 4/2003 | Sekiguchi | 701/301 |
| 2003/0088361 A1 | * | 5/2003 | Sekiguchi | 701/301 |
| 2003/0097237 A1 | * | 5/2003 | Sekiguchi | 702/158 |
| 2004/0054473 A1 | * | 3/2004 | Shimomura | 701/301 |
| 2004/0080449 A1 | * | 4/2004 | Horibe | 342/70 |

OTHER PUBLICATIONS

"Compact multibeam imaging antenna for automotive radars", Schoenlinner,B.; Rebeiz, G.M.;Microwave Symposium Digest, 2002 IEEE MTT–S International,vol.:2, Jun. 2–7, 2002 Ps:1373–1376.*

* cited by examiner

Primary Examiner—John B. Sotomayor
(74) Attorney, Agent, or Firm—Beyer Weaver & Thomas LLP (57) ABSTRACT

A radar device mounted to a vehicle includes a camera for obtaining images including the road surface in front of or behind the vehicle on which it is mounted, a sensor having for obtaining at least positional information on a target object of detection such as another vehicle in front or behind and a control unit for correcting the direction of the center axis of the sensor based on the image obtained by the camera. The control unit detects a line segment along a lane in which the vehicle is traveling, detects a vector indicative of the direction on a road-fixed coordinate system of the obtained line segment, and controls correction of horizontal and vertical directions of the center axis of the sensor so as to coincide with the direction of the detected vector.

10 Claims, 8 Drawing Sheets

RADAR DEVICE FOR A VEHICLE

BACKGROUND OF THE INVENTION

This invention relates to a radar device intended to be installed on a vehicle such as an automobile.

In order to improve ease and safety in the operation of an automobile, functions for monitoring and cruising after a front-running vehicle are sometimes provided. For realizing such functions, a radar device having a sensor such as a laser radar or a millimeter-wave radar may be installed on a vehicle ("the own vehicle" of the user) for obtaining at least position data on a target object of detection either in front or behind such as a front-running vehicle or a guard rail. For such a vehicle-mounted radar device, it is desirable to adjust the direction of the light to be emitted (or the direction of the center point of the area to be scanned and hereinafter sometimes referred to as the optical axis) in order not to miss the front-running vehicle even when it is running on a curve. Such a technology has been described, for example, in Japanese Patent Publication 9-218265.

This prior art technology is for the case of a flat road with no slopes and with curves with nearly constant curvature such as large highways. Thus, the probability of losing track of a front-running vehicle may be kept low with such a technology if the road is flat and curves always at a constant rate but it is likely to miss the front-running vehicle where there are many slopes and the radius of curvature of the road changes frequently as inside a big city even if the optical axis of the radar device is adjusted according to this prior art technology. This is because the direction of the optical axis is determined by this technology on the basis of the curvature of the road and the lateral positions of the own and front-running vehicles. Since the optical axis could not be corrected in the vertical direction and since the optimum vertical direction of the optical axis could not be determined, the vertical direction of the optical axis remained the same. Thus, if the road is sloped, the front-running vehicle may move out of the detectable area either upward or downward and may cease to be detectable.

Moreover, since this prior art technology would treat S-shaped curves of roads as having a constant radius of curvature in determining the optimum vertical direction of the optical axis, a large error would result in the horizontal direction whenever there are fine changes in the curvature of the road and the front-running vehicle is likely to move sideways out of the target area of detection.

SUMMARY OF THE INVENTION

It is therefore an object of this invention to provide a radar device mounted to a vehicle which is capable of appropriately correcting the direction of the optical axis of its sensor and does not easily lose sight of a front-running vehicle even in the presence of slopes and S-shaped curves.

A radar device embodying this invention is a vehicle-mounted device and may be characterized as comprising an image taking means for obtaining an image including a road surface in front of or behind the vehicle ("own vehicle") to which it is mounted, a sensor having a center axis for obtaining at least positional information on a target object of detection (such as another vehicle) in front of or behind the own vehicle and a control means for correcting the direction of the center axis of the sensor based on the image obtained by the image taking means. The control means may be characterized as including a line segment detecting means for detecting a line segment along a lane in which the own vehicle is traveling, a vector detecting means for detecting a vector indicative of the direction on a road-fixed coordinate system of the line segment obtained by the line segment detecting means, and a correcting means for controlling correction of horizontal and vertical directions of the center axis of the sensor so as to coincide with the direction of the vector detected by the vector detecting means.

In the above, the target object of detection is basically intended to be another vehicle on the road either in front of or behind the "own vehicle" to which the subject device is mounted, and "another vehicle" in this context is intended to include vehicles with other than four wheels such as motor-bikes but the target object of detection may also include structures other than vehicles such as guard rails. The sensor is, for example, an instrument such as a laser or millimeter-wave radar adapted to irradiate a detection area with electromagnetic or sonic waves and to detect a target object of detection on the basis of reflected waves. This sensor need not necessarily be of a scan type and may be of a non-scan type but must be provided with directionality, having a specified detection area. Thus, the center axis of the sensor means the axis directed to the center of the detection area, not the physical center axis of the structure of the sensor. For this reason, this center axis is also hereinafter referred to as the optical axis, or the optical axis of the sensor. In the case of a sensor of the scan type, this is the center axis of the area to be scanned, or the center axis of the range to be scanned.

In the above, the expression "line segment along a lane in which the own vehicle is traveling" means a segment of a line (or an edge) which forms the image of a mark on the road on one side or both sides of the lane on which the own vehicle is traveling (such as white or yellow single, double or broken lines), a guard rail, a central road dividing zone, a protective wall and a boundary with a side walk or an optical flow obtained from the time-change of their images.

Detection of such a line segment (from an image) may be effected reasonably dependably by a so-called edge detection method if the (bright-dark) gradation is clear as in the case of a white line. In order to improve the dependability of detection by eliminating the image components corresponding to stains on the road and roadside structures or to lower the detection threshold such that even an edge with unclear gradation (such as the edge of a road-center divider) can also be reliably detected, it is preferable to preliminary limit the area of detection in terms of conditions, say, on the angular positions of the line segments to be detected. Such a detection area may be limited, as shown in FIG. 5C, to the angular range of 30°–60° from the left-hand bottom corner of the image frame and that of 120°–150° from the right-hand bottom corner (both measured in the counter-clockwise direction from the direction to the right as the likely areas for the lines to be detected to appear on the screen. It is easy and also natural to set the image taking means (the camera) at a position and in a direction such that the boundary lines of the lane in which the own vehicle is traveling (such as white lines and road-center divider) will fall inside such areas. By excluding the remainder of the areas on the image for the purpose of detection, the desired line segments alone can be detected more easily and dependably.

By using a radar device according to this invention, the center axis of the sensor is corrected to the direction on the road-fixed coordinate system of the line segments along the lane in which the own vehicle is traveling on the image of the front or back of the own vehicle. Thus, it is hardly likely to lose sight of a target object of detection (especially a vehicle in front or behind) even on a road with constantly changing radius of curvature or having many slopes. If line segments are detected from white lines on the road at a specified distance in front (corresponding to a specified position on the image in the vertical direction) and the center axis of the sensor is corrected to the direction of the line segment on the road-fixed coordinate system, for example, the center axis of the sensor can be corrected horizontally and vertically corresponding to the three-dimensional direction of the road in front of or behind the own vehicle, independent of the curvature or slope of the road in the vicinity where the own vehicle is currently traveling. According to this invention, since the direction of the center axis of the sensor moves upward and downward according to the slope of the road in front or behind, in particular, the vertical correction which has not been done in prior art technologies is coming to be possible and it becomes rare to lose sight of a vehicle in front even on a road with slopes.

In order to still better adapt to road conditions with S-shaped curves and slopes, it is preferable to detect a plurality of line segments and to select a vector from the directions of the individual line segments such that the road in front or behind can be clearly surveyed.

According to a preferable embodiment of the invention, the line segment detecting means serves to detect at least a pair of line segments on both sides of a lane on which the own vehicle is traveling and the vector detecting means detects the vector by determining a vanishing point on the image as intersection of extensions of this pair of line segments and detecting the vector from this vanishing point. This embodiment is preferable because the image taking means may be realized with a simple construction with only one camera.

For obtaining the vector from a vanishing point as explained above, it is preferable to include a partitioning means for partitioning the image obtained by the image taking means into a plurality of zones and that the line segment detecting means serves to detect pairs of line segments by detecting one of the pairs of line segments in each of these zones, and that the vector detecting means detects the vector by determining a plurality of vanishing points from these pairs of line segments, detecting triangular areas each having a top corner at corresponding one of the vanishing points and bottom corners at points on the most closely positioned one of the pairs of line segments, calculating shared areas between the triangular areas and the area of the lane on the image, selecting one of the triangular areas having the largest of the shared areas, and detecting the vector from the vanishing point corresponding to the selected one of the triangular areas. In the above, the area of the lane may be obtained as an area surrounded by the plurality of line segments.

According to an alternative embodiment of the invention, the line segment detecting means serves to detect a bottom pair of line segments in the lowest one of the horizontally elongated zones along the bottom edge of the image and the vector detecting means detects the vector by determining the vanishing point from the bottom pair of line segments, selecting a plurality of points scattered horizontally and vertically on the image within a specified area centered around the determined vanishing point, detecting triangular areas each having a top corner at corresponding one of the selected points and bottom corners at points on the bottom pair of line segments in the lowest zone, calculating shared areas between these triangular areas and the area of the lane on the image, selecting one of the triangular areas having the largest of the shared areas, and detecting the vector from the selected point corresponding to the selected one of the triangular areas.

With a device according to either of the above two embodiments, the center axis of the sensor is corrected from the coordinates of a plurality of vanishing points or points scattered around the one vanishing point such that a target object of detection such as a vehicle in front or behind cannot be lost sight of even on a road full of S-shaped curves and/or slopes.

The latter embodiment is particularly advantageous in that only one vanishing point needs to be calculated. In the former embodiment, it is preferable that the vector detecting means serves to determine excludable zones where a target object of detection overlaps or is considered likely to overlap either of the line segments on the image on the basis of position data on the target object of detection obtained from the sensor and to exclude the excludable zones thus determined when determining the vanishing points.

The direction of the center axis of the sensor may be effected periodically while the own vehicle is running or whenever its ignition switch is turned on but the process efficiency can be improved if it is arranged to be carried out only when "necessary" or only when one of predetermined conditions becomes satisfied. Such conditions may include that the object of detection is detected to have changed horizontal position on the image, that the own vehicle is detected to have changed its speed, that the own vehicle is detected to have become tilted with respect to the horizontal plane, and that the own vehicle is detected to have changed lanes.

DETAILED DESCRIPTION OF THE INVENTION

Figure 1A:
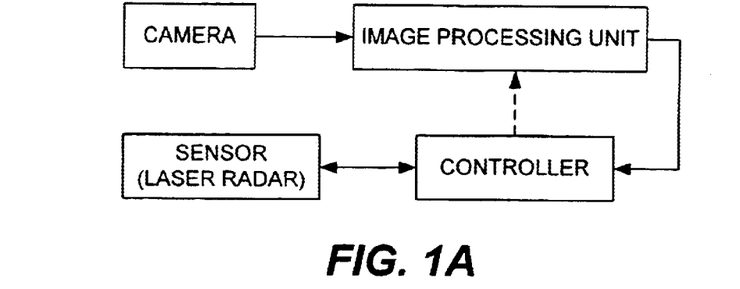
FIGS. 1A, 1B and 1C, together referred to as FIG. 1, show the structure of a radar device embodying this invention, FIG. 1A being its block diagram for showing its overall structure, FIG. 1B being a functional block diagram of its image processing unit and FIG. 1C being a functional block diagram of another image processing unit according to a different embodiment of the invention.

The invention is described next by way of examples with reference to the drawings. FIG. 1A is a block diagram for showing the overall structure of a radar device embodying this invention adapted to be mounted to a vehicle and FIG. 1B is a functional block diagram for explaining the functions of its image processing unit.

Figure 6:
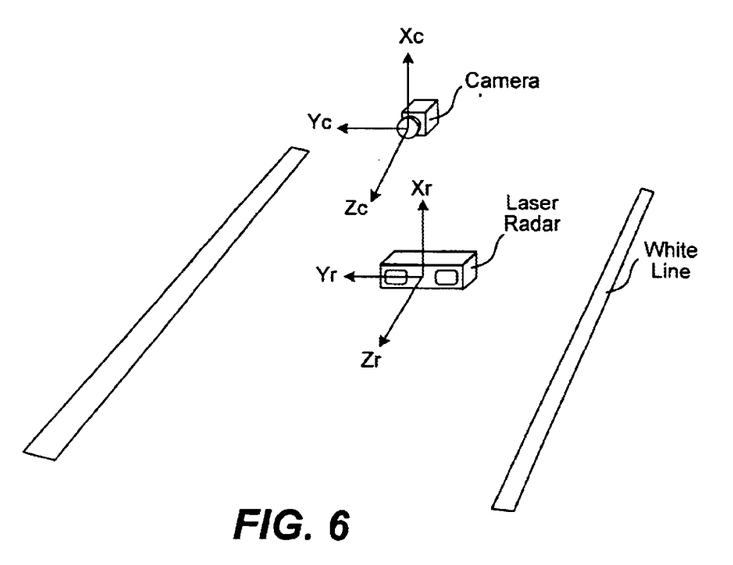
FIG. 6 is a drawing for explaining the relationship between the camera-fixed and road-fixed coordinate systems.

As shown in FIG. 1A, the radar device comprises a camera 1, a sensor 2, an image processing unit 3 and a controller 4. The camera 1 is an image taking means of a known kind such as a CCD and a CMOS. As schematically shown in FIG. 6, the camera 1 is set on a vehicle (the user's "own vehicle") facing the front diagonally downward so as to be able to obtain images including the condition of the road in front of the own vehicle.

The sensor 2 may be a laser radar. The image processing unit 3 comprises a circuit including a microcomputer and adapted to obtain and output an optimum direction of the optical axis of the sensor 2. The controller 4 is for controlling an actuator (not shown) to change the direction of the optical axis of the sensor 2 so as to point in the optimum direction outputted from the image processing unit 3. The controller 4 may also be a circuit including a microcomputer. The image processing unit 3 and the controller 4 may be structured as a single integrated unit.

Figure 1B:
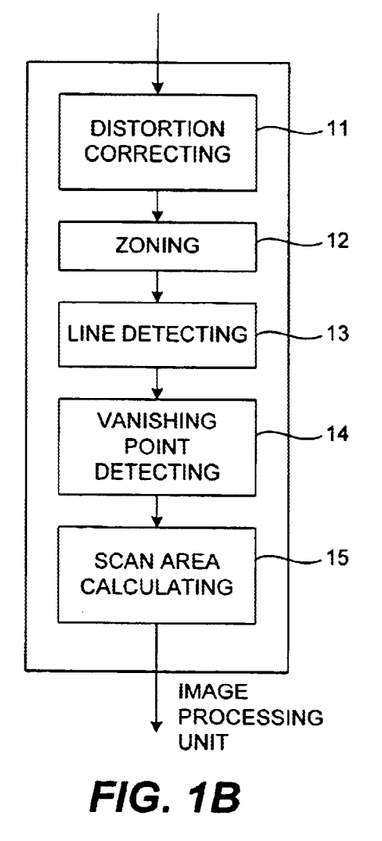

Functionally described, the image processing unit 3 includes a distortion correcting part 11, a zoning part 12, a line detecting part 13, a vanishing point detecting part 14 and a scan area calculating part 15, as shown in FIG. 1B. The distortion correcting part 11 is for correcting image data obtained by the camera 1 for eliminating the effects of the lens distortion of the camera 1. The zoning part 12 is for partitioning an image into small zones (with elongated belt-like areas) including line segments so as to be able to handle road conditions with variable curvatures such as S-shaped curves. The line detecting part 13 is for detecting white lines (as well as yellow lines and broken lines serving to define a traffic lane, hereinafter referred to simply as "lines") on both sides of each lane on the road on which the own vehicle is traveling. The vanishing point detecting part 14 is for detecting what is herein referred to as the vanishing point (to be explained below) on an image from the line segments detected from each zone. The scan area calculating part 15 is for obtaining an optimum direction of the optical axis from the vanishing point calculated for each zone.

Next, the operation of the device of this invention is described with reference to the flowchart of FIG. 2. As shown, the device repeats the series of processes shown as Steps S1–S14 in a cyclic manner. In Step S1, the distortion correcting part 111 reads out image data from the camera 1 and carried out a distortion correction process, say, by using Equation (1) to convert coordinate (x, y) of a pixel in the image into another coordinate (x', y'), thereby correcting distortion of the camera lens:

$$\begin{bmatrix} x' \\ y' \end{bmatrix} = \frac{2}{1 + \sqrt{1 - 4\kappa(x^2 + y^2)}} \begin{bmatrix} x \\ y \end{bmatrix} \quad \text{Equation (1)}$$

where κ is a negative constant.

Figure 3A:
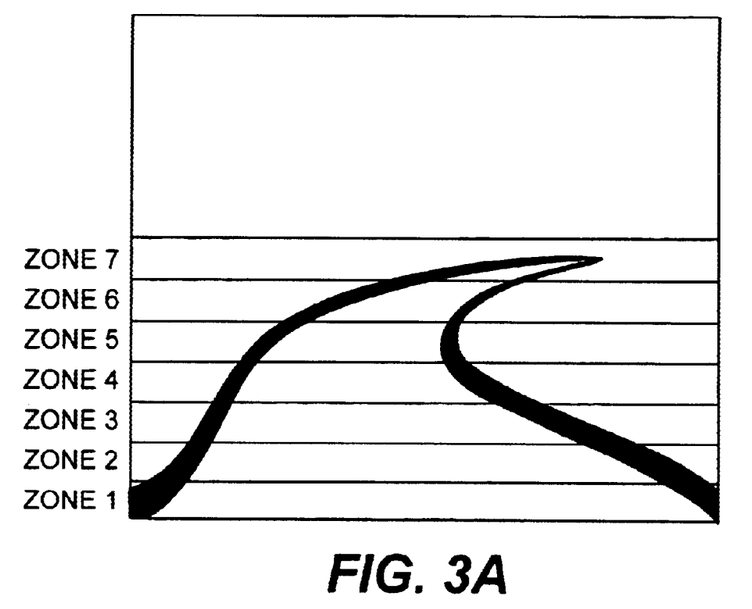
FIGS. 3A and 3B are drawings for explaining the zones and vanishing point on an image.

In Step S2, the zoning part 12 sets the image data for partitioning the image into a plural N-number of horizontally elongated belt-shaped zones so as to include the road in front, for example, as shown in FIG. 3A. In the above, to "include the road in front" means to include at least an area showing the road on the lower part of the image frame. The width of each zone is set equal to the total width of the image itself, and the height (vertical dimension) of each zone is equal to the height of the lower part of the image frame containing the image of the road divided by N, which is equal to 7 in the example shown in FIG. 3A and thereafter.

Next, the line detecting part 13 carries out Steps S3–S6 for each of the zones. In Step S3, an edge detector such as a Sobel filter as shown in Equation (2) below is used for edge extraction, or to obtain an edge image:

$$g(x, y) = \sum_{i=-m}^{m} \sum_{j=-n}^{n} w_{ij} \cdot f(x+i, y+j) \quad \text{Equation (2)}$$

$$w_{ij} = \begin{bmatrix} -1 & 0 & 1 \\ -2 & 0 & 2 \\ -1 & 0 & 1 \end{bmatrix}, m = 1, n = 1$$

where f(x, y) indicates the pixel brightness at position (x, y) on the image and g(x, y) indicates the value after the filtering, or the difference in brightness between neighboring pixels.

In Step S4, line candidates are extracted. This may be done by binarizing the grayscale image (or edge image) given by g(x, y) calculated by Equation (2) by using an appropriate threshold value (such as 128 in the case of 256 gradations) and thereby obtaining the coordinates of the inside edges of the lines on both sides of the road (or the lane). Explained more in detail, as one moves from the left to the right on the edge image, if the threshold value is exceeded and if there is thereafter a position (or a coordinate) at which the threshold value is crossed in the reverse direction with the width therebetween less than a specified value B, the first position is supposed to be the left-hand side (or outside) edge of a line on the left-hand side of the road (or lane) and the second position is supposed to be the right-hand side (or inside) edge of the same line. In a similar manner, the left-hand side (or inside) edge of a line on the right-hand side of the road (or lane) can be estimated. The coordinates of the positions of these inside edges of the two lines are treated as candidate points for the lines on the road of interest. Normally, as many candidate points are obtained as the number of pixels in the vertical direction in the horizontally elongated belt-shaped zone. The aforementioned specified value B is used in order to ignore candidates with a width that is excessively different from that of the actual lines on the road such that only edges of real lines (expressed with reference to a road-fixed coordinate system) may be reliably detected.

In order to avoid erroneously identifying image components of dirt on the road surface and roadside structures as lines in this process for extracting candidate positions, it is desirable to preliminarily limit the position, area or angle for detecting a line to be within a possible range, as explained above with reference to FIG. 5C.

In Step S5, Hough transformation is carried out on these candidate positions and two most appropriate straight lines (or line segments or extensions thereof) are obtained for each zone as lines tangent to the inner edges of the lines. This is a process for obtaining Hough curves on the ρ-θ plane corresponding to the coordinates (x, y) of the candidate points on the image (defining the x-y plane) by Equation (3) given below and extracting a straight line on the image from the coordinates of the intersection of these Hough curves:

$$\rho = x \cdot \cos\theta + y \cdot \sin\theta \quad \text{Equation (3)}$$

In this process, the two most appropriate straight lines can be obtained by determining two intersection points ($\rho_a$, $\theta_a$) and ($\rho_b$, $\theta_b$) where many of the Hough curves obtained from the plurality of candidate points because a straight line on the image can be determined if the values of ρ and θ in Equation (3) are fixed. FIG. 5B shows the positional relationship between (x, y) and (ρ, θ).

In Step S6, the vanishing point detecting part 14 calculates the coordinates of the vanishing point, which is defined as the intersection of the aforementioned two straight lines. Thus, they are calculated from the data $(\rho_a, \theta_a)$ and $(\rho_b, \theta_b)$ as follows by Equation (4):

$$\begin{bmatrix} x \\ y \end{bmatrix} = \frac{1}{\cos\theta a \cdot \sin\theta b - \cos\theta b \cdot \sin\theta a} \begin{bmatrix} \sin\theta b & -\sin\theta a \\ -\cos\theta b & \cos\theta a \end{bmatrix} \begin{bmatrix} \rho a \\ \rho b \end{bmatrix} \quad \text{Equation (4)}$$

Figure 3B:
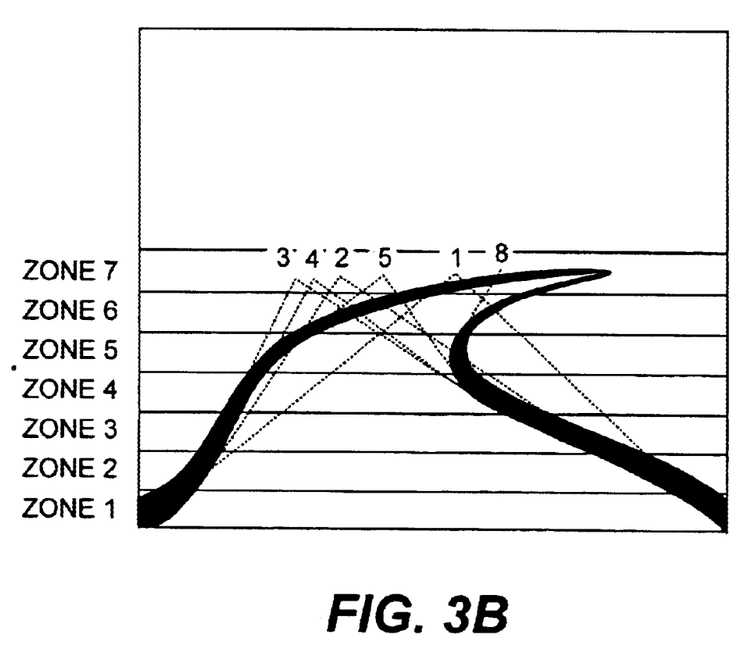

FIG. 3B shows an example of vanishing points. The broad bands in the figure represent lines on the road and broken lines are straight extensions of the line segments on the inner edges of the lines for each zone. Circled numerals 1–6 indicate the vanishing points corresponding to the individual zones. It is to be noted that no vanishing point could be obtained for the seventh zone in this example.

In Step S7, it is examined whether the number of times Steps S3–S6 have been repeated is less than N, that is, whether the processes of Steps S3–S6 have been completed for all of the belt-shaped zones. If the total number of repetition has not reached N, the program returns to Step S3 and the processes are repeated for the next zone. If the total number has reached N, the program proceeds next to Step S8 since the processes on all zones have been completed.

Figure 4A:
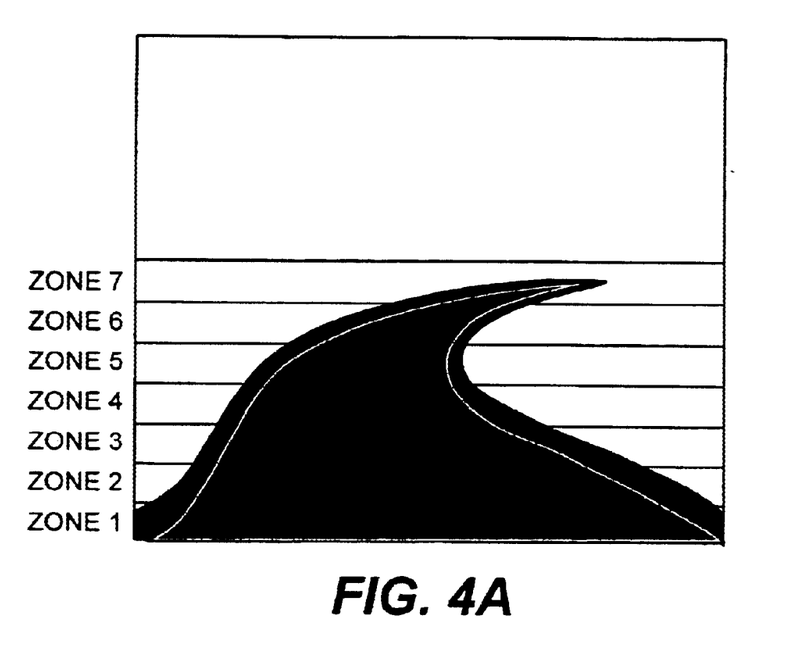
FIGS. 4A and 4B are drawings for explaining the road area and triangular area on an image.

In Step 8, the scan area calculating part 15 detects the road area. The road area, in the example of FIGS. 3A and 3B, is the shaded area shown in FIG. 4A and may be detected on the basis of the coordinates of the points on the inner edges of the lines obtained in Steps S3–S4.

Figure 4B:
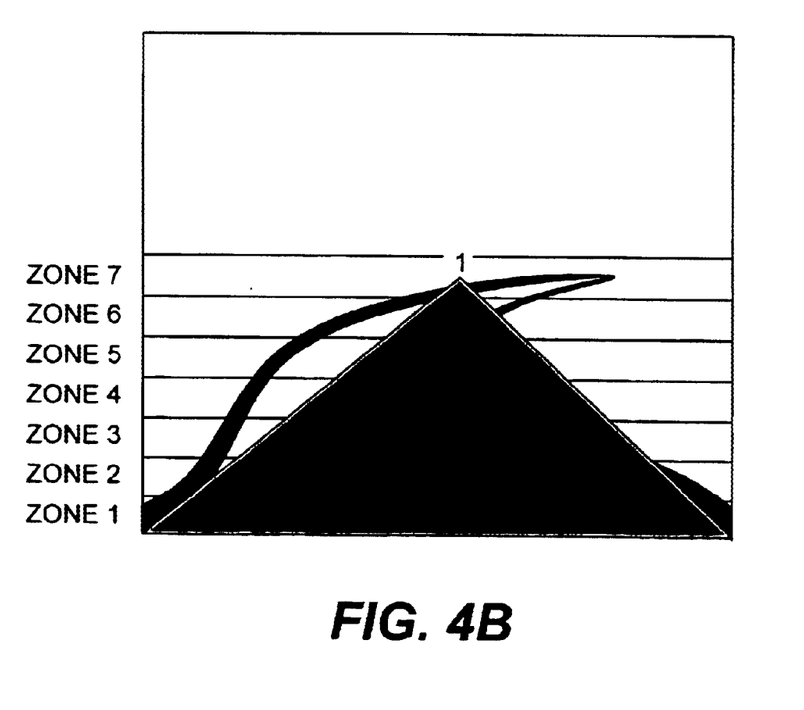

Next, Steps S9–S10 are carried out for each of the elongated belt-shaped zones. In Step S9, up to N triangular areas each with one of the vanishing points at the top corner and the closest points on the inner edges of the lines on the image being the remaining two corners The shaded area in FIG. 4B indicates such a triangle corresponding to Zone 1. The coordinates of its top corner are as obtained in Step S6 for Zone 1 and the coordinates of its two bottom corners can be obtained as the lower ends of the two straight lines identified in Step S5. Similar triangular areas corresponding to Zones 2, 3, etc. can be similarly obtained. It is to be noted that the bottom side of the triangle shown in FIG. 4B corresponding to Zone 1 coincides with the entire width of the image frame but that it is not always the case. For example, the points on inner edges of the lines at the upper boundary of Zone 1 may be chosen and the two bottom corners of the triangle or the points on the outer edges of the lines may be selected. If there is no line image in Zone 1, points on the lines in Zone 2 may be used as bottom corners.

In Step S10, the shared area common to both the road area detected in Step S8 and the triangle determined in Step S9 is obtained.

In Step S11, as done in Step S7, it is examined whether or not the processes of Steps S9–S10 have been completed for all of the belt-shaped zones. If the processes of Steps S9–S10 have been completed for all of the belt-shaped zones, the scan area calculating part 15 proceeds to Step S12 and, if otherwise, it returns to Step S9. In Step S12, the zone ($N_{max}$) having the largest shared area is identified. In what follows, for the convenience of description, the sixth zone is assumed to have the largest shared area, that is $N_{max}$=6.

In Step S13, the coordinates ($X_6$, $Y_6$) of the vanishing point for Zone $N_{max}$ (=$N_6$) are converted into a road-fixed coordinate system (xr, yr, zr) as shown in FIG. 6 to obtain vector $V_6$ indicating the direction of the vanishing point in the road-fixed coordinate system. Since the sensor 2 is usually set on the radiator of the vehicle above the front bumper, a sensor-fixed coordinate system may be considered substantially the same as the road-fixed coordinate system for the purpose of adjusting the orientation of the sensor 2 and no serious problem will result if the orientation is effected on the basis of data obtained in the road-fixed coordinate system, although the road-fixed and sensor-fixed coordinate systems are not exactly the same.

The road-fixed coordinate system (xr, yr, zr), the camera-fixed coordinate system (xc, yc, zc) as shown in FIG. 6 and the two-dimensional image-fixed coordinate system (X, Y) are related by Equations (5) and (6) given below:

$$\begin{bmatrix} xc \\ yc \\ zc \end{bmatrix} = R \begin{bmatrix} xr \\ yr \\ zr \end{bmatrix} + T. \ R = [R_{ij}]. \ T = [T_i] \ (i, j = 1, 2, 3) \quad \text{Equation (5)}$$

$$X = F\frac{xc}{zc}, \ Y = F\frac{yc}{zc} \quad \text{Equation (6)}$$

where R is a 3×3 matrix and T is a 3×1 column matrix to be preliminarily fixed at the time of calibrating the camera 1. In Equation (6), F indicates the focal distance of the camera 1.

Coordinates (X6, Y6) of the vanishing point can be converted into the road-fixed coordinate system. This may be done by first substituting X6 and Y6 into Equation (6) to make a conversion into the camera-fixed coordinate system (xc, yc, zc) by Equation (7) given below:

$$\begin{bmatrix} xc \\ yc \\ zc \end{bmatrix} = \begin{bmatrix} k \cdot X6/F \\ k \cdot Y6/F \\ k \end{bmatrix} \quad \text{Equation (7)}$$

where zc is set equal to k. Next, Equation (7) is substituted into Equation (5) as in Equation (8) shown below:

$$\begin{bmatrix} xr \\ yr \\ zr \end{bmatrix} = R^{-1} \cdot \left( \begin{bmatrix} k \cdot X6/F \\ k \cdot Y6/F \\ k \end{bmatrix} - T \right) \quad \text{Equation (8)}$$

where the value of k may be calculated by using appropriate constraining conditions. For example, the range of the laser radar such as 150 m may be substituted into zr of Equation (8) to obtain the value of k. Vector $V_6$, and hence its direction, can be determined from the coordinates of the aforementioned vanishing point in the road-fixed coordinate system.

In Step S14, the optimum orientation of the optical axis is obtained from vector $V_6$ and is outputted to the controller 4. Receiving this output, the controller 4 moves the optical axis to the calculated optimum direction so as to coincide with vector $V_6$.

Figure 5A:
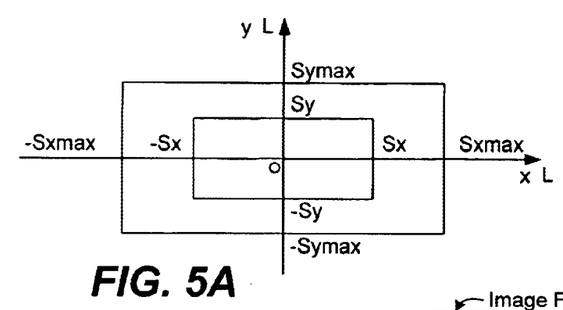
FIGS. 5A, 5B and 5C are drawings for explaining the range of scan by the laser radar.
Figure 5B:
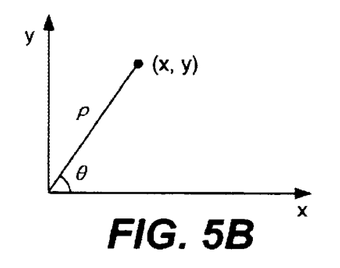
Figure 5C:
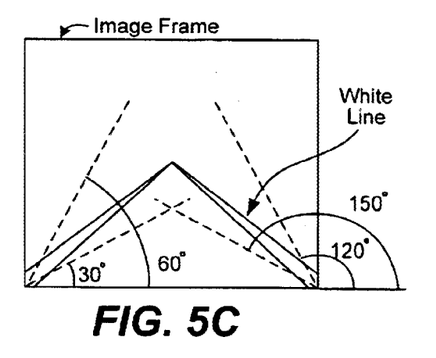

FIG. 5A shows the scan area (range) of the laser radar 2, the origin O indicating the center of the scan area under normal (uncorrected) conditions. The normal range of scan is indicated by (−Sx, Sx) and (−Sy, Sy), and the maximum scan range is indicated by (−Sxmax, Sxmax) and (−Symax, Symax) respectively in the horizontal and vertical directions. In other words, the maximum amount of correction in the horizontal direction (xL) is Sxmax−Sx, and the maximum amount of correction in the vertical direction (yL) is Symax−Sy. Thus, the optimum position of the optical axis is given by Equation (9) given below:

$$\begin{bmatrix} xL \\ yL \end{bmatrix} = \frac{1}{\sqrt{xr^2 + yr^2 + zr^2}} \begin{bmatrix} xr \cdot (Sx\max - Sx) \\ xy \cdot (Sy\max - Sy) \end{bmatrix} \quad \text{Equation (9)}$$

from the components (xr, yr, zr) of vector $V_6$ obtained above.

With a radar device thus structured, since the optical (central) axis of the sensor is corrected in the direction of a line segment along the lane (such as the inner edge of the line) on which the own vehicle is traveling, the target object of detection such as the front-running vehicle or the vehicle behind that is following is not likely to be lost sight of even on a road with slopes or curved in an S-shape. With a radar device according to this embodiment, in particular, it is difficult to lose sight of a target vehicle even on a road with a constantly changing radius of curvature and/or slopes because the central axis of the sensor is corrected to the direction of the vanishing point selected out of a plurality of vanishing points obtained by partitioning the image into zones such that the road in front as a whole can be most conveniently surveyed.

It is to be noted, furthermore, that the image taking means may be of a simple structure comprising a single camera because the vector for directional correction is obtained by determining a vanishing point.

Figure 8:
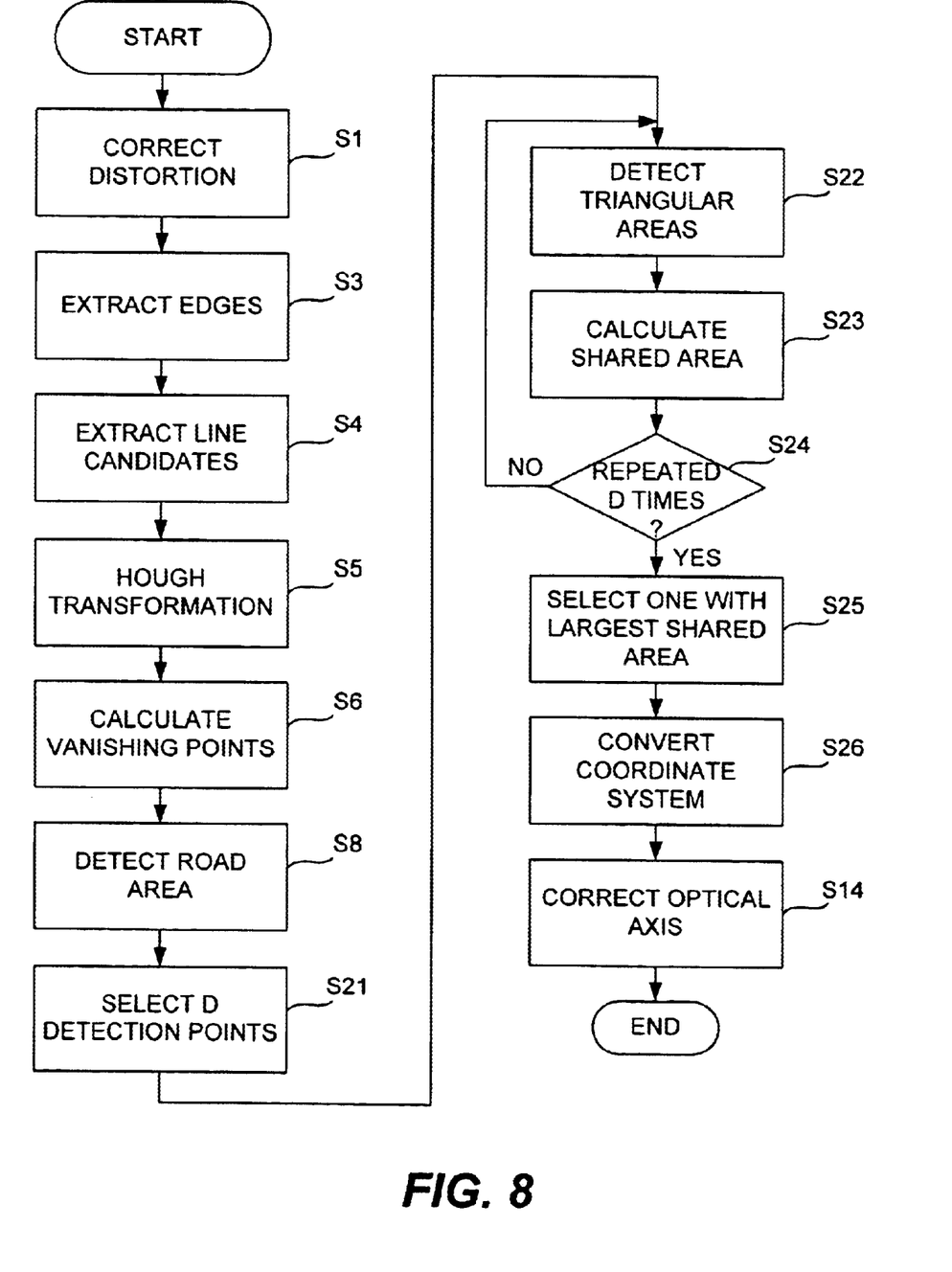
FIG. 8 is a flowchart of the process for correcting the optical axis according to a second embodiment of the invention.

A second embodiment of the invention is described next with reference to the flowchart of FIG. 8. Since the second embodiment is different from the first embodiment described above regarding only the processing by the image processing unit 3, those of the steps identical to corresponding ones in the flowchart shown in FIG. 2 are indicated by the same step numbers and may not be explained below in a repetitious manner.

Figure 7A:
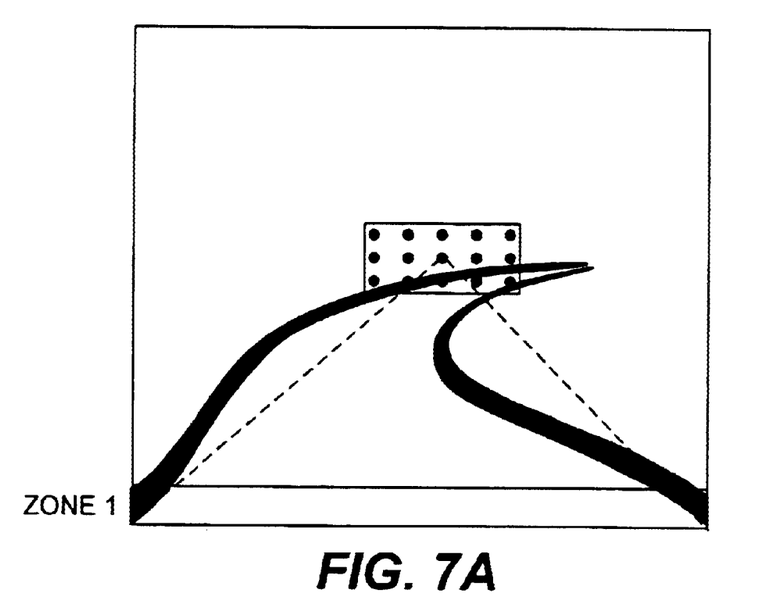
FIGS. 7A and 7B are drawings for explaining another example of the invention.

According to the second embodiment of the invention, the vanishing point is determined only regarding the lowest one of the zones (zone 1 with N=1) (Steps S3–S6). In Step S21 after aforementioned Step S8, a plural D-number of points (or their coordinates) which are scattered within a rectangular area with sides extending in the horizontal and vertical directions and having its center at the vanishing point for N=1. In the example shown in FIG. 7A, D=3×5=15 and fifteen points are arranged in a matrix formation in 3 horizontal rows and 5 vertical columns at equal intervals.

Figure 2:
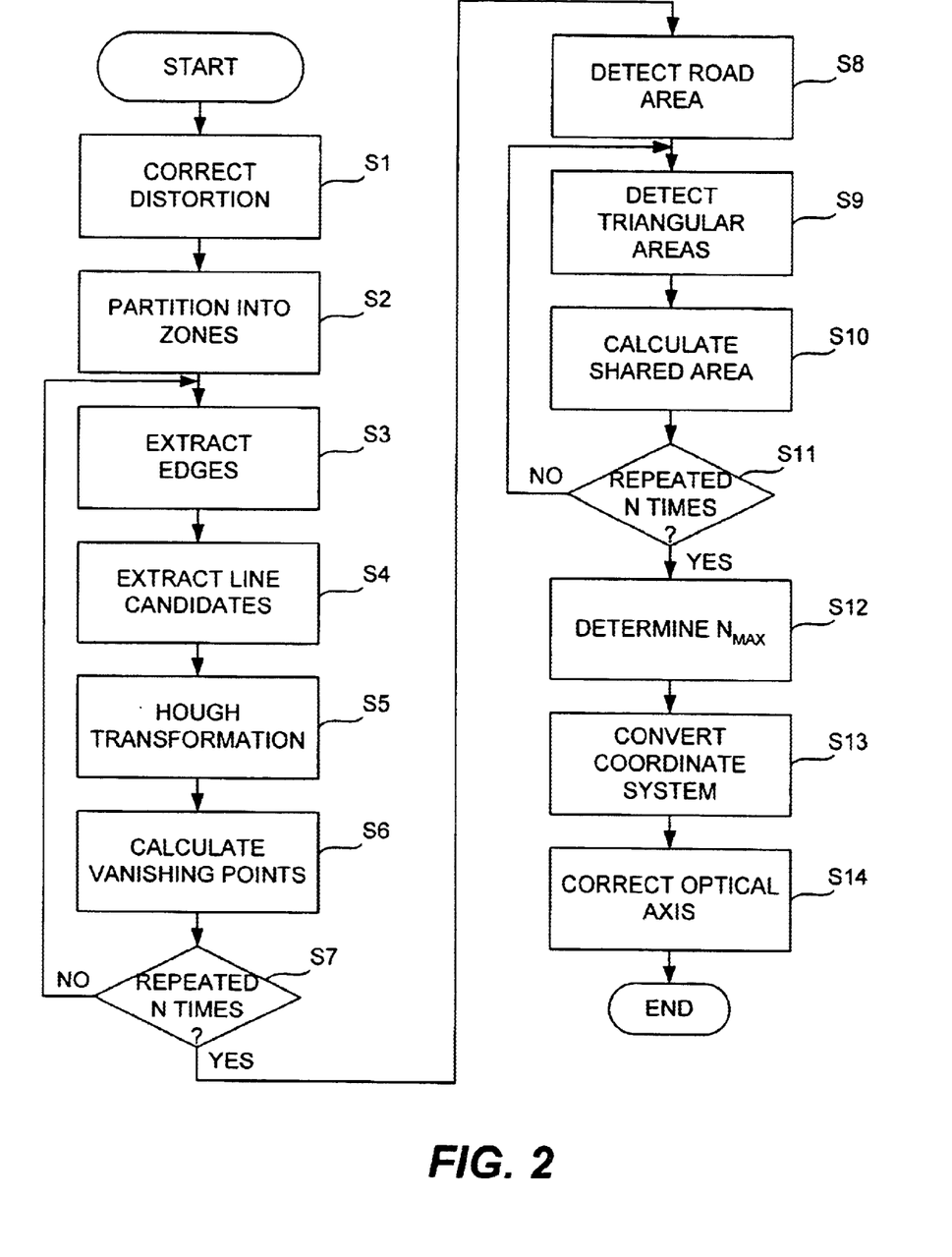
FIG. 2 is a flowchart of the process for correcting the optical axis according to a first embodiment of the invention.

Steps S22–S26 are similar to Steps S9–S13 of FIG. 2 and hence will not be described in detail. In Step S22, triangular areas each with the top corner at a different one of the D points and the two bottom corners at points on the lines on both sides are considered. In Step S23, a shared (common) area between each of these triangular areas and the road area is calculated. This is continued for all of the D-number of triangular areas (Step S24), and the one with the largest common area with the road area is identified (Step S25). In Step S26, the coordinates of the top corner point of the selected triangular shape is converted into a road-fixed coordinate system and a vector is obtained, as done in Step S13. The controller 4 corrects the optical axis according to the vector thus obtained (Step S14).

The second embodiment has the advantage, in addition to the advantages of the first embodiment of this invention described above, in that only one vanishing point needs to be calculated.

Figure 9:
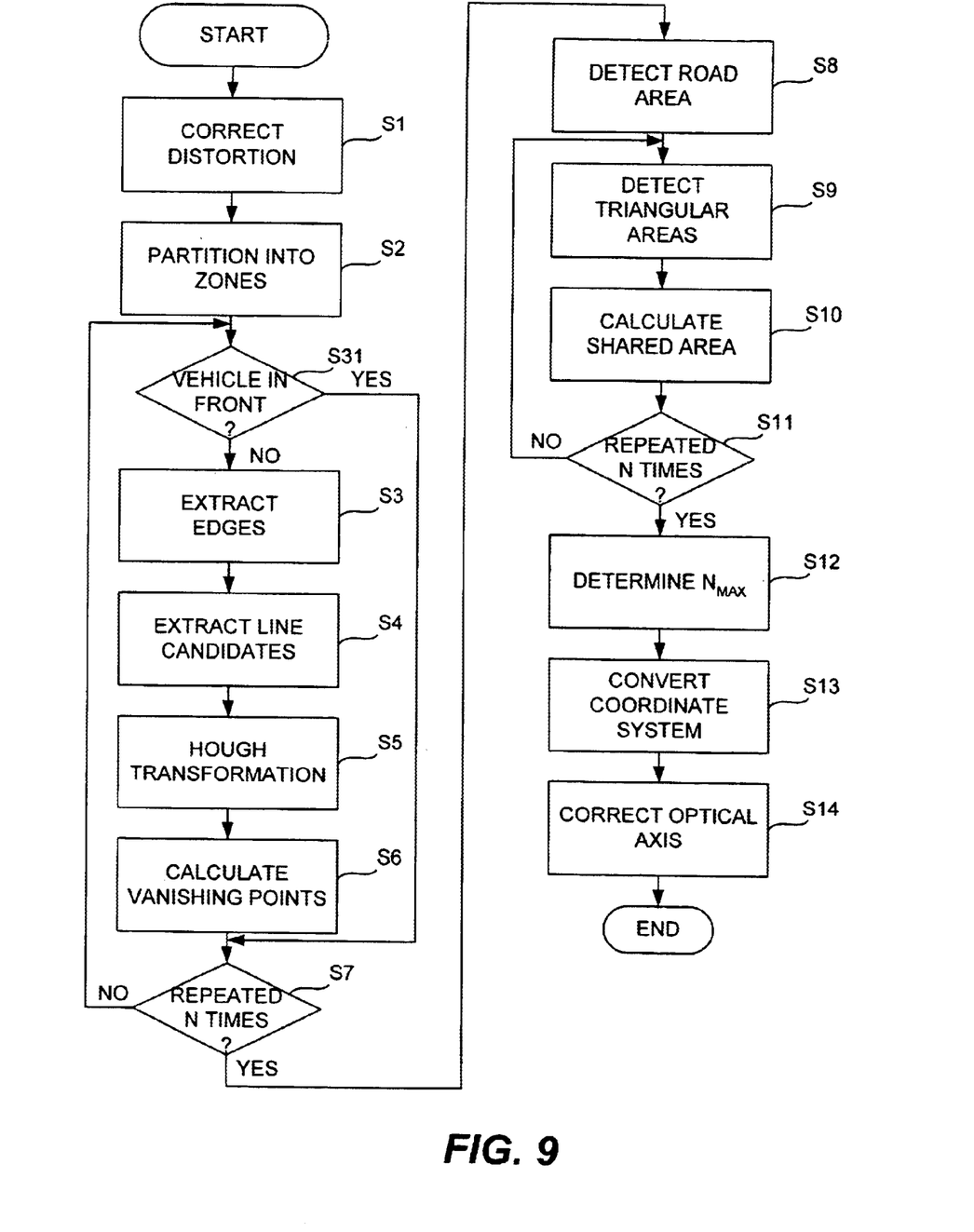
FIG. 9 is a flowchart of the process for correcting the optical axis according to a third embodiment of the invention.

A third embodiment of the invention is described next with reference to the flowchart of FIG. 9. Since the third embodiment, too, is different from the first embodiment described above regarding only the processing by the image processing unit 3, those of the steps identical to corresponding ones in the flowchart shown in FIG. 2 are indicated by the same step numbers and may not be explained below in a repetitious manner. For the third embodiment of the invention, however, the laser radar needs to be so structured that at least some of the data on the detection result by the laser radar 2 (such as the position of another vehicle) can be inputted from the controller 4 to the image processing unit 3, as indicated by a broken arrow in FIG. 1A.

After Step S2 according to the third embodiment, it is judged on the basis of data of detection result by the laser radar 2 whether or not there is a possibility of another vehicle in the zone in which the vanishing point is being investigated, such another vehicle overlapping the line segment (Step S31). If there is such another vehicle present (YES in Step S31), Steps S3–S6 are skipped and the calculation for the vanishing point for this zone is not carried out.

The aforementioned judgment regarding the presence or absence of another vehicle may be made, for example, by obtaining the position of such another vehicle on the image on the basis of data (position data on another vehicle) of detection result by the laser radar 2, forming a histogram in the neighborhood of this position, identifying an area of the image where such another vehicle is by determining its approximate width and/or height. The ratios of this area overlapping with each of the belt-line elongated zone areas are calculated and it may be concluded that another vehicle exists in the zones where the overlapping ratios are larger than a specified threshold value.

Figure 7B:
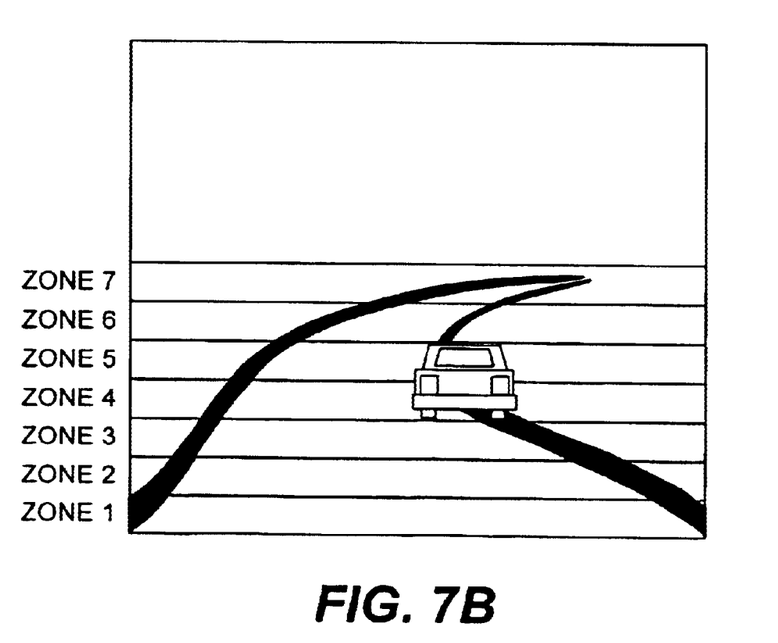

According to this embodiment of this invention, zones in which another vehicle exists are excluded when the process for obtaining the aforementioned vector (or the vanishing point) is carried out. If an image as shown in FIG. 7B is obtained, for example, Zones 4 and 5 are excluded. Thus, even if the vehicle in front is traveling over an edge of the lane (inclusive of the boundary line between two lanes) and the line segment from the hidden portion of the line cannot properly be detected, the invention does not make is impossible to make a correction or to make a proper correction.

Figure 1C:
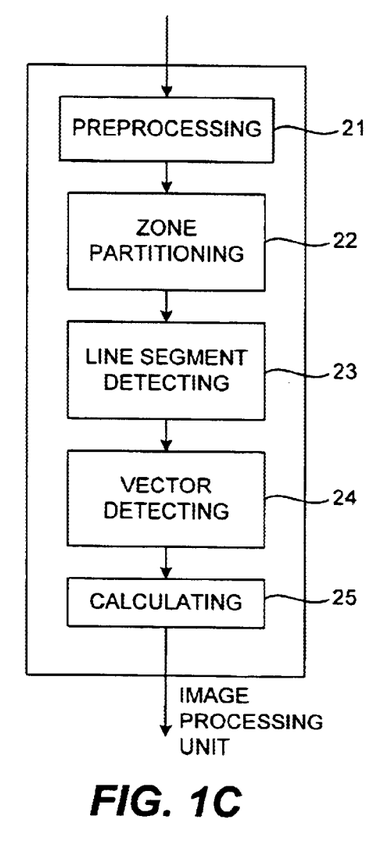

Although the invention has been described above by way of only a limited number of examples, these examples are not intended to limit the scope of the invention. Many modifications and variations are possible within the scope of the invention. For example, the image processing unit 3 may be structured as shown in FIG. 1C, comprising a preprocessing part 21, a zone partitioning part 22, a line segment detecting part 23, a vector detecting part 24 and a calculating part 25. The preprocessing part 21 corresponds to the distortion correcting part 11 of FIG. 1B and may serve to carry out not only geometrical corrections of the lens distortion as described above but also brightness corrections such as the gamma corrections and contrast enhancement and removal of noise such as median filtering, whenever necessary.

The zone partitioning part 22 partitions the image but not necessarily into horizontally elongated zones with belt-like shapes. The image may be partitioned into vertically elongated belt-like zones or into a lattice form. When an image is thus partitioned into zones, there remains the problem of determining how to associate corresponding line segments into pairs on both sides of a lane and pointing to the same vanishing point but, for example, line segments detected in mutually symmetric areas on the left-hand and right-hand sides of the image may be selected as a pair of line segments. When the image is partitioned into vertically elongated belt-shaped zones, for example, a first vanishing point may be determined as the intersection of the line segment detected in the zone farthest to the left and that detected in the zone farthest to the right, a second vanishing point as the intersection of the line segments detected in the zones second from the left and second from the right, and so forth. When the image is partitioned into belt-like elongated zones, the widths of the zones need not be the same. The number of zones need not be N=7 and may be variable.

The line segment detecting part 23 corresponds to the line detecting part 13 of FIG. 1B but may also be adapted to detect a line forming the image of a structure such as a guard rail or an optical flow obtained from the time-rate of change of such an image as the line segment of this invention.

The vector detecting part 24 corresponds to a portion of the vanishing point detecting part 14 and the scan area calculating part 15 of FIG. 1B but may be adapted to obtain the vector without determining the vanishing point. For this mode, a plurality of cameras may be set to obtain three-dimensional positions of points of the segment by triangulation and the direction of the line segment may be calculated in the road-fixed coordinate system. By such a method, a vector is obtained for a single line segment, or for each of line segments. In other words, there is no need to detect pairs of line segments as required by the prior art technology.

The calculating part 25 serves to obtain an optimum direction of the optical axis from the calculated vector and corresponds to the scan area calculating part 15 of FIG. 1B.

Although an example was described above wherein a plurality of vectors (vanishing points) were obtained from a plurality of line segments obtained by partitioning the image and one of these vectors which maximizes the overlapping area of the aforementioned triangular area and the road area, this is not the only mode of correcting the optical axis by finally selecting a vector from a plurality of line segments. For example, a plurality of line segments may be detected at different longitudinal positions on a line such as a line segment comprising the line at a relatively distant position from the own vehicle (at an upper part of the image) and another line segment comprising the line at a relatively near position from the own vehicle (at a lower part of the image) and the center axis of the sensor may be corrected to their average direction. The mode of not obtaining the vanishing point may also be included. Such an average direction may not necessarily be the best direction but a larger portion of the road can be surveyed than by the prior art technology which corrects the optical axis on the assumption that the curvature of the road is always the same and the front-running vehicle is less likely to escape detection.

Although the image processing unit 3 and the controller 4 in this example constitute the control means of this invention and the processes of FIG. 2 are adapted to be carried out periodically to correct the optical axis regularly but the correction of the optical axis may be effected only when necessary, such as when a change in the horizontal position of the front-running vehicle has been detected.

Although the third embodiment of the invention was described above as obtaining a vector (or a vanishing point) by excluding the zones where another vehicle is sighted because there is a possibility in such zones that such a vehicle may be overlapping with the line segment, such zones need not necessarily be excluded if it can be ascertained that there is no such overlapping (for example, if the vehicle is in the middle of a lane and it can be ascertained that it is not near an edge of the lane). In such a situation, only the zones where the vehicle is overlapping with the line segment are excluded.

In summary, with a radar device embodying this invention, it is not likely to miss a target object of detection such as a vehicle in front or behind even if the road has slopes and curves with varying curvature because the central axis (or optical axis) of its sensor is corrected in the direction of the line segment with respect to a road-fixed coordinate system along the lane in which its own vehicle is traveling.

What is claimed is:

1. A radar device for a vehicle, said radar device comprising:
    an image taking means for obtaining an image including a road surface in front of or behind said vehicle;
    a sensor having a center axis for obtaining at least positional information on an object of detection in front of or behind said vehicle; and
    a control means for correcting the direction of said center axis of said sensor based on said image obtained by said image taking means, said control means including:
    a line segment detecting means for detecting on said image a line segment along a lane in which said vehicle is traveling;
    a vector detecting means for detecting a vector indicative of the direction on a road-fixed coordinate system of said line segment obtained by said line segment detecting means; and
    a correcting means for controlling correction of horizontal and vertical directions of said center axis so as to coincide with the direction of said vector detected by said vector detecting means.

2. The radar device of claim 1 wherein said line segment detecting means serves to detect at least a pair of line segments on both sides of a lane on which said vehicle is traveling and said vector detecting means detects said vector by determining a vanishing point on said image as intersection of extensions of said pair of line segments and detecting said vector from said vanishing point.

3. The radar device of claim 2 further comprising a partitioning means for partitioning said image obtained by said image taking means into a plurality of zones, wherein said line segment detecting means serves to detect pairs of line segments by detecting one of said pairs of line segments in each of said zones, and wherein said vector detecting means detects said vector by determining a plurality of vanishing points from said pairs of line segments, detecting triangular areas each having a top corner at corresponding one of said vanishing points and bottom corners at points on the most closely positioned one of said pairs of line segments, calculating shared areas between said triangular areas and the area of said lane on said image, selecting one of said triangular areas having the largest of said shared areas, and detecting said vector from the vanishing point corresponding to said selected one of the triangular areas.

4. The radar device of claim 2 wherein said line segment detecting means serves to detect a bottom pair of line segments in a lowest of horizontally elongated zones along bottom edge of said image and wherein said vector detecting means detects said vector by determining said vanishing point from said bottom pair of line segments, selecting a plurality of points scattered horizontally and vertically on said image within a specified area centered around said determined vanishing point, detecting triangular areas each having a top corner at corresponding one of said selected points and bottom corners at points, calculating shared areas between said triangular areas and the area of said lane on said image, selecting one of said triangular areas having the largest of said shared areas, and detecting said vector from the selected point corresponding to said selected one of said triangular areas.

5. The radar device of claim 3 wherein said vector detecting means serves to determine excludable ones of said zones where a target object of detection overlaps or is considered likely to overlap either of the line segments on said image on the basis of position data on said target object of detection obtained from said sensor and to exclude said excludable zones thus determined when determining said vanishing points.

6. The radar device of claim 1 wherein said control means stats to correct the direction of said center axis of said sensor when at least one of conditions are satisfied, said conditions including:

condition that said object of detection is detected to have changed horizontal position on said image;

condition that said vehicle is detected to have changed speed;

condition that said vehicle is detected to have tilted with respect to the horizontal plane; and condition that said vehicle is detected to have changed lanes.

7. The radar device of claim 2 wherein said control means stats to correct the direction of said center axis of said sensor when at least one of conditions are satisfied, said conditions including:

condition that said object of detection is detected to have changed horizontal position on said image;

condition that said vehicle is detected to have changed speed;

condition that said vehicle is detected to have tilted with respect to the horizontal plane; and condition that said vehicle is detected to have changed lanes.

8. The radar device of claim 3 wherein said control means stats to correct the direction of said center axis of said sensor when at least one of conditions are satisfied, said conditions including:

condition that said object of detection is detected to have changed horizontal position on said image;

condition that said vehicle is detected to have changed speed;

condition that said vehicle is detected to have tilted with respect to the horizontal plane; and condition that said vehicle is detected to have changed lanes.

9. The radar device of claim 4 wherein said control means stats to correct the direction of said center axis of said sensor when at least one of conditions are satisfied, said conditions including:

condition that said object of detection is detected to have changed horizontal position on said image;

condition that said vehicle is detected to have changed speed;

condition that said vehicle is detected to have tilted with respect to the horizontal plane; and condition that said vehicle is detected to have changed lanes.

10. The radar device of claim 5 wherein said control means stats to correct the direction of said center axis of said sensor when at least one of conditions are satisfied, said conditions including:

condition that said object of detection is detected to have changed horizontal position on said image;

condition that said vehicle is detected to have changed speed;

condition that said vehicle is detected to have tilted with respect to the horizontal plane; and condition that said vehicle is detected to have changed lanes.

* * * * *